US010519353B2

(12) United States Patent
Crain et al.

(10) Patent No.: US 10,519,353 B2
(45) Date of Patent: Dec. 31, 2019

(54) B2 RATED ONE COMPONENT SPRAY POLYURETHANE FOAM FORMULATION FOR FENESTRATION OPENINGS

(71) Applicant: Dow Global Technologies LLC, Midland, MI (US)

(72) Inventors: Steven P. Crain, Midland, MI (US); Lars Massueger, Zurich (CH); Carolin Boehm, Menden (DE)

( * ) Notice: Subject to any disclaimer, the term of this patent is extended or adjusted under 35 U.S.C. 154(b) by 0 days.

(21) Appl. No.: 15/516,797

(22) PCT Filed: Oct. 22, 2015

(86) PCT No.: PCT/US2015/056795
§ 371 (c)(1),
(2) Date: Apr. 4, 2017

(87) PCT Pub. No.: WO2016/069356
PCT Pub. Date: May 6, 2016

(65) Prior Publication Data
US 2017/0247591 A1   Aug. 31, 2017

Related U.S. Application Data
(60) Provisional application No. 62/072,474, filed on Oct. 30, 2014.

(51) Int. Cl.
| | | |
|---|---|---|
| *C09K 3/10* | (2006.01) |
| *C08G 18/76* | (2006.01) |
| *C08G 18/08* | (2006.01) |
| *C08G 18/48* | (2006.01) |
| *C08K 5/521* | (2006.01) |
| *C08G 18/66* | (2006.01) |
| *C08G 18/38* | (2006.01) |
| *C08K 5/00* | (2006.01) |
| *B05D 1/02* | (2006.01) |
| *C08G 18/20* | (2006.01) |
| *C08J 9/00* | (2006.01) |
| *C08J 9/14* | (2006.01) |
| *C08G 101/00* | (2006.01) |
| *C09K 21/00* | (2006.01) |

(52) U.S. Cl.
CPC ............. *C09K 3/1021* (2013.01); *B05D 1/02* (2013.01); *C08G 18/0871* (2013.01); *C08G 18/14* (2013.01); *C08G 18/2081* (2013.01); *C08G 18/381* (2013.01); *C08G 18/4812* (2013.01); *C08G 18/4825* (2013.01); *C08G 18/4829* (2013.01); *C08G 18/4833* (2013.01); *C08G 18/4879* (2013.01); *C08G 18/667* (2013.01); *C08G 18/7664* (2013.01); *C08J 9/0038* (2013.01); *C08J 9/141* (2013.01); *C08J 9/142* (2013.01); *C08J 9/149* (2013.01); *C08K 5/0016* (2013.01); *C08K 5/521* (2013.01); *C08G 2101/005* (2013.01); *C08G 2101/0008* (2013.01); *C08G 2101/0058* (2013.01); *C08G 2150/60* (2013.01); *C08G 2190/00* (2013.01); *C08J 2203/12* (2013.01); *C08J 2203/14* (2013.01); *C08J 2203/182* (2013.01); *C08J 2205/05* (2013.01); *C08J 2205/06* (2013.01); *C08J 2375/08* (2013.01); *C09K 21/00* (2013.01)

(58) Field of Classification Search
None
See application file for complete search history.

(56) References Cited

U.S. PATENT DOCUMENTS

| | | | |
|---|---|---|---|
| 3,984,359 A | 10/1976 | Collins et al. | |
| 5,157,056 A * | 10/1992 | McGovern | C08G 18/4072 521/107 |
| 5,894,083 A | 4/1999 | Hiraoka et al. | |
| 9,034,936 B2 | 5/2015 | Battistini et al. | |
| 2004/0024077 A1 * | 2/2004 | Braun | C08G 18/12 521/155 |
| 2006/0047010 A1 | 3/2006 | O'Leary | |
| 2007/0054972 A1 | 3/2007 | Braun et al. | |
| 2009/0253819 A1 | 10/2009 | Reese et al. | |
| 2010/0056660 A1 * | 3/2010 | Rosthauser | C08G 18/4018 521/172 |
| 2013/0251975 A1 * | 9/2013 | Kampf | C08J 9/149 428/304.4 |
| 2015/0025164 A1 | 1/2015 | Golini et al. | |

FOREIGN PATENT DOCUMENTS

| | | |
|---|---|---|
| CN | 101319039 A | 12/2008 |
| CN | 101735425 A | 6/2010 |
| CN | 102391774 A | 3/2012 |
| EP | 1944334 | 7/2008 |
| EP | 1533429 B1 | 12/2010 |
| EP | 2360197 | 8/2011 |
| JP | 2004115617 | 4/2004 |
| JP | 2009533506 | 9/2009 |
| WO | 2010058036 | 5/2010 |
| WO | 2013058341 | 4/2013 |
| WO | 2014033231 | 3/2014 |

OTHER PUBLICATIONS

"DIN 4102-1 Brandverhalten von Baustoffen und Bauteilen Teil 1: Baustoffe Begriffe, Anforderungen und Prufungen." May 1, 1998 (May 1, 1998), DIN Deutsches Institut fur Normung e.V., XP055022865.
Singh, H. and Jain, A.K., Journal of Applied Polymer Science, vol. 111, 1115-1143 (2009).
Search report from corresponding Japanese 2017-522388 application, dated Apr. 25, 2018.

\* cited by examiner

*Primary Examiner* — Shamim Ahmed
*Assistant Examiner* — Bradford M Gates
(74) *Attorney, Agent, or Firm* — Andrew G. Bunn

(57) ABSTRACT

A one component spray polyurethane foam formulation containing a polymeric isocyanate with nominal functionality of 2.5 to 3.5, a polyol component that is at least 85 percent aliphatic and having a mole ratio of polyol with three or more functionality to total polyol of 0.2 to 0.75, 15-30 wt % of a plasticizer, 1.5-3.5 wt % phosphorous, 5.5 to 11.5 halogen and 1.5 to 5 millimoles of blowing agent per gram of formulation and that is free of expandable graphite achieves a B2 rating in DIN 4102 testing.

9 Claims, No Drawings

B2 RATED ONE COMPONENT SPRAY POLYURETHANE FOAM FORMULATION FOR FENESTRATION OPENINGS

BACKGROUND OF THE INVENTION

Field of the Invention

The present invention relates to a one component spray polyurethane foam formulation that achieves a B2 rating in DIN 4102 testing and that is suitable for use in sealing fenestration openings.

Introduction

Fenestration openings in building structures offer challenging locations for insulation. Fenestration openings typically have gaps between the fenestration frames and the supporting structure around the fenestration opening. The gaps are a source of energy leakage if they are not sealed and insulated. Polymeric spray foam insulation/sealant is a common and convenient choice for filling these fenestration gaps. In particular one component spray polyurethane foam (OCF) is a desirable choice for insulating fenestration gaps.

Fenestration gaps provide technical challenges for insulation/sealants. To seal the fenestration gap, the insulation/sealant must adhere to the structural materials defining the gap and remain adhered to those structural materials as they undergo thermal expansion and contraction with weather changes and structural shifts as the building structure settles. Therefore, the structural adhesive must be an adhesive material, but must also be a flexible material.

For convenience in application, it is desirable for the insulation/sealant to be a spray foam material, more particularly a OCF formulation to avoid difficulties associated with metering multiple components such as is required in two-component spray polyurethane foam formulations. At the same time, the foam formed by the OCF formulation needs to be sufficiently flexible not only to move with the structural materials to which it adheres, but also to conform to the gap spacing without deforming the structural members defining the gap. If a spray foam formulation forcefully expands into a rigid foam, the expansion can move the structural materials defining the gap and thereby cause fenestrations intended to fit within a fenestration opening to no longer fit in the opening properly.

The OCF should form an open-cell foam structure to allow blowing agent to escape from the foam and to allow moisture to escape from fenestration gaps, but at the same time inhibit excessive airflow so as to fail to have insulating properties. Therefore, it is desirable for a foam to have an air flow rate between 0.001 liters per second (L/s) and 0.02 L/s as determined by ASTM D3574.

A great deal of research and development has gone into identifying a OCF formulation that meets these requirements for use as a fenestration gap insulator/sealant. See, for example, WO2014/033231A1 and WO 02/12367A1 for two published patent applications that provide proposed solutions to OCF formulations for use in fenestration gaps.

An added challenge for OCF fenestration insulation/sealant materials is a need now to achieve certain flame retardant performance to meet code restriction. In particular, it is required for the OCF to achieve a B2 rating in DIN 4102 testing in some countries. Examples In WO2014/033231A1 show that a B2 rating is only achieved when the foam contains more than 12 weight-percent halogen (bromine plus chlorine) based on foam formulation weight. It is desirable to find a way to achieve a B2 rating without requiring so much halogen in the foam. WO2010/058036 describes a OCF that contains expandable graphite to enhance flame retardant properties. However, expandable graphite is a solid particulate that can complicate dispensing of OCF formulation by plugging openings in dispensing means used to apply the OCF formulation. Therefore, it is desirable to avoid using expandable graphite in a OCF formulation.

It is desirable and would advance the art of OCF technology to discover a OCF formulation that produces a flexible, open-celled foam and that achieves a B2 flame retardancy rating in DIN 4102 testing without containing expandable graphite and while containing less than 12 weight-percent halogen based on formulation weight.

BRIEF SUMMARY OF THE INVENTION

The present invention offers a solution to the problem of discovering a sprayable OCF formulation that produces a flexible, open-celled and that achieves a B2 flame retardancy rating in DIN 4102 testing without containing expandable graphite and while containing less than 12 weight-percent halogen based on formulation weight.

The present invention is a result of surprisingly discovering that balancing a particular ratio of higher functional polyols (those polyols having three or more hydroxyl functional groups per molecule) to total polyols with a plasticizer provides a OCF formulation that produces the solution foam with less than 12 weight-percent halogen based on formulation weight. The ratio of polyols surprisingly effects flame retardancy, with optimal flame retardancy occurring when the stated polyol ratio is in a range of 0.2 to 0.75.

The formulation of the present invention is useful as a one component spray polyurethane foam (OCF) formulation, particularly for use as an insulating/sealant material for fenestration opening gaps.

DETAILED DESCRIPTION OF THE INVENTION

Test methods refer to the most recent test method as of the priority date of this document unless a date is indicated with the test method number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institute für Normung; and ISO refers to International Organization for Standards.

"And/or" means "and, or as an alternative". All ranges include endpoints unless otherwise indicated.

The formulation of the present invention is a one component spray polyurethane foam (OCF) formulation. OCF formulations are self-expanding, self-adhesive, moisture curing polyurethane formulations that are dispensed from a single pressurized container. OCF formulations expand into a polyurethane foam that cures in the presence of moisture.

OCF formulations are different from two-component spray polyurethane foam formulations. Two-component spray polyurethane foam formulations comprise two different chemical components, a polyol component and a isocyanate component, that react with one another to cure in to a polyurethane. In a two-component spray polyurethane foam formulation the polyol component and isocyanate component are fed together into a dispensing device, mixed and sprayed from the dispensing device where the mixture foams and cures by chemically reacting with one another. The compositions of OCF formulations and two-component spray polyurethane foam formulations are materially different or the OCF formulation would cure prior to use.

The OCF formulation of the present invention is particularly designed to have properties desirable for sealing and insulating gaps around fenestration openings. As such, the foam formed by the OCF formulation is a flexible foam, which means that it has a compressive recovery of more than 45%, preferably 50% or more and can be 55% or more, 60% or more, 65% or more, 70% or more, 75% or more, 80% or more, 85% or more, 90% or more, 95% or more, even 100% after compression by 75% of the foam's original thickness. Evaluate compressive recovery according to ISO 1856 after compressing to 75% of original thickness for three days and allowing 24 hours for recovery. Thickness corresponds to the smallest dimension of a foam sample. Foam has three mutually perpendicular dimensions: thickness, width and length. Thickness corresponds to the dimension having the smallest magnitude while length corresponds to the dimension having the largest magnitude. Desirably, test the flexibility of the foam formed by an OCF formulation using a foam having a thickness of approximately 20 millimeters.

The OCF formulation of the present invention comprises a polymeric isocyanate. Suitable polymeric isocyanates include aliphatic, cycloaliphatic, aryliphatic and preferably aromatic polyisocyanates. Examples of suitable polymeric isocyanates include alkylene diisocyanates having from 4 to 12 carbon atoms in the alkylene moiety (such as 1,12 dodecane diisocyanate; 2-methylpentamethylene 1,5-diisocyanate; tetramethylene 1,4-diisocyanate; and hexamethylene 1,6-diisocyanate), cycloaliphatic diisocyanates (such as cyclohexane 1,3- and 1,4-diisocyanate; 1-siocyanato-3,3,5-trimethyl-5-isocyanatomethylcyclohexane; 2,4- and 2,6-hexahydrotoluene diisocyanate and the corresponding isomer mixtures; 4,4'-, 2,2'- and 2,4'-dicyclohexylmethane diisocyanate and the corresponding isomer mixtures) and preferably aromatic diisocyanates and polyisocyanates (such as 2,4- and 2,6-toluene diisocyanate and the corresponding isomer mixtures; 4,4'-, 2,4'- and 2,2'-diphenylmethane diisocyanates; polymethylene polyphenyl isocyanates; mixtures of 4,4'-, 2,4'- and 2,2'-diphenylmethane diisocyanates; and polymethylene polyphenyl isocyanates (PMDI); any diphenylmethane diisocyanate or PMDI that is modified to contain oligomers that contain ore or more biuret groups as described in WO2011/073355; and mixtures of PMDI and toluene diisocyanates).

The polymeric isocyanate has a nominal functionality of 2.5 or more and at the same time 3.5 or less, preferably 3.0 or less. Nominal functionality refers to the average number of reactive groups per molecule. For the polymeric isocyanate, the nominal functionality refers to the moles of —NCO functional groups per mole of isocyanate molecules. When the nominal functionality is below 2.5 the polymeric isocyanate tends to be difficult to handle because it is often a solid at 25° C. and it tends to form dimers. When the nominal functionality is greater than 3.5 the cost is undesirably high and the viscosity tends to be undesirably high.

The polymeric isocyanate is present at a concentration sufficient to provide a concentration in a range of 10 weight-percent (wt %) or more, preferably 12 wt % or more and at the same time 20 wt % or less, preferably 15 wt % or less —NCO functional groups base on the total weight of isocyanate and polyol in the formulation. When the concentration of —NCO functional groups is less than 10 wt % the formulation experiences undesirably excessive collapse when frothed to form a foam. When the concentration of —NCO functional groups is greater than 20 wt % the elastic recovery diminishes and can tend to be undesirably low.

The OCF formulation of the present invention comprises a polyol component. The polyol component can be a single type of polyol or a blend of more than one type of polyol. Suitable polyols include polyester polyols and polyether polyols. The polyol component is at least 85 wt %, preferably 90 wt % or more and can be 95 wt % or more or 100 wt % aliphatic polyol base on total polyol weight. If the polyol is less than 85 wt % aliphatic, the elastic recovery of the resulting foam tends to be undesirably low. Aliphatic polyols are free of aromatic functionality.

Polyester polyols include those obtainable from conventional synthesis means using polycarboxylic acids and polyfunctional alcohols having from 2 to 12 carbon atoms. Examples of suitable polycarboxylic acids include glutaric acid, succinic acid, adipic acid, sebacic acid, phthalic acid, isophthalic acid, and teraphthalic acid. Examples of suitable polyfunctional alcohols that can be combined with any of these polycarboxylic acids include ethylene glycol, propanediol including propylene glycol, butanediol, and hexanediol.

Polyether polyols include those obtainable using conventional synthesis means by reacting alkylene oxides (such as those selected from a group consisting of ethylene oxide, propylene oxide and butylene oxide) with an initiator having two active hydrogen atoms for a diol and with an initiator having three active hydrogen atoms for a triol and initiators having more than three active hydrogen atoms for polyols with more than three hydroxyl functional groups. Examples of suitable initiators include ethylene glycol, diethylene glycol, propylene glycol, dipropylene glycol, tripropylene glycol, 1,4-butanediol, 1,6-hexane diol; cycloaliphatic diols such as 1,4-cylcohexane diol, glycerine, trimethanoyl propane, triethanolamine, sucrose and aromatic based initiators or mixtures thereof. Desirable polyols are those obtainable using propylene oxide or a combination of propylene and ethylene oxide.

Desirably, the polyol component is or comprises a blend of polyether polyols. The blend of polyether polyols preferably is or comprises a blend of triols and diols or a blend of triols. For example, a desirable blend of triols and diols has: (a) 50 percent of the hydroxyl functional groups as secondary hydroxyl functional groups; (b) an average triol number average molecular weight of 500 grams per mole (g/mol) or more, preferably 600 g/mol or more and more preferably 800 g/mol or more while at the same time 3000 g/mol or less, preferably 2500 g/mol or less, more preferably 1500 g/mol or less; and (c) a diol number average molecular weight of 4000 g/mol or more, preferably 5000 g/mol or more and more preferably 6000 g/mol or more while at the same time 12,000 g/mol or less, preferably 10,000 g/mol or less.

Desirably, the OCF formulation of the present invention desirably contains less than 4 wt %, preferably 3 wt % or less, more preferably 2 wt %, even more preferably one wt % or less, yet more preferably 0.5 wt % or less and most preferably is free of halogenated polyols, with wt % relative to total OCF formulation weight. When halogenated polyols are present at a concentration of 4 wt % or more based on OCF formulation weight the resulting foam tends to be undesirably rigid.

Surprisingly, the present invention is a result of discovering a surprising result of achieving a B2 rating under DIN4102 testing when the polyol component has a mole ratio of polyol having three or more hydroxyls per molecule to total moles of all polyols (a ratio herein referred to as "rhoB") that is 0.75 or less. At the same time, sufficient flexibility is achieved to qualify as a "flexible" foam only when rhoB is 0.2 or more. Therefore, the polyol component has a mole ratio of polyol having three or more hydroxyls per molecule to total moles of all polyols in the formulation that is 0.2 or more, preferably 0.3 or more, more preferably 0.4 or more, still more preferably 0.5 or more, yet more preferably 0.6 or more and at the same time is 0.75 or less and can be 0.7 or less, 0.65 or less or even 0.6 or less.

The OCF formulation of the present invention further comprises both phosphorous and halogen in order to achieve the B2 performance rating in DIN4102 testing. The phosphorous and halogen can be on the same molecule in the OCF formulation or on different molecules.

Overall, the OCF formulation contains phosphorous at a concentration of 1.5 wt % or more, preferably 2 wt % or more and can be 2.5 wt % or more while at the same time is typically 3.5 wt % or less, and more typically 3 wt % or less and can be 2.5 wt % or less and even 2 wt % or less with wt % relative to the total weight of OCF formulation without blowing agent. When the phosphorous concentration is less than 1.5 wt % the fire performance tends to suffer. When the phosphorous concentration is greater than 3.5 wt % the resulting foam tends to shrink.

The halogens present in the OCF formulation can be any halogen or combination of halogens, but are desirably selected from chlorine and bromine. Preferably, chlorine is present and chlorine can be the only halogen present. The OCF formulation can be free of bromine. Overall, the OCF formulation contains a concentration of halogens that is 5.5 wt % or more, preferably 6 wt % or more, more preferably 6.5 wt % or more and can be 7 wt % or more, 7.5 wt % or more and even 8 wt % or more while at the same time is typically 11.5 wt % or less, and can be 11 wt % or less, 10 wt % or less, 9 wt % or less, even 8 wt % or less with wt %. When the concentration of halogen is below 5.5 wt %, the fire performance suffers. When the concentration of halogen exceeds 11.4 wt % the resulting foam tends to become rigid. In general, it is desirable to use chlorine instead of bromine because bromine has a tendency to inhibit elasticity in the resulting foam. In that regard, it is desirable for the bromine to be present at a concentration of 1.5 wt % or less, preferably 1.0 wt % or less, more preferably 0.5 wt % or less and even more preferably for the OCF formulation to be free of bromine. Wt % of halogen is relative to total weight of OCF formulation without blowing agent.

The OCF formulation of the present invention further comprises a plasticizer. The plasticizer can contain phosphorous, halogens, or both phosphorous and halogen. In fact, the plasticizer can be the sole source of the halogens, phosphorous or both the phosphorous and halogens. The plasticizer can also be free of halogens, phosphorous or both halogens and phosphorous. The plasticizer serves to soften the foam formed from the OCF formulation by plasticizing the resulting polymer matrix of the foam. Suitable plasticizers include:

(a) those containing both phosphorous and halogens such as, for example, tris(2-chloroethyl) phosphate (TCEP) and tris(2-chloroisopropyl) phosphate (TCPP);
(b) those containing phosphorous but not halogens such as, for example, dimethyl propyl phosphate (DMPP), triethyl phosphate (TEP), dimethyl methyl phosphonate (DMMP) and diethyl ethyl phosphonate (DEEP);
(c) those containing halogens but not phosphorous such as, for example, chlorinated paraffins, liquid brominated or chlorinated plasticizers such as those sold under the trade name UNIPLEX™ FRP49 N-1 and liquid brominated phthalates such as those sold under the trade name UNIPLEX™ FRP-42 (UNIPLEX is a trademark of Unitex Chemical Corporation); and
(d) those neither containing phosphorous nor halogens such as, for example, dimethyl adipate (DMADP), dibutylphthalate (DBP), phthalate esters in general, sebacates, adipates, terphthalates, dibenzoates, gluterates, azelates, epoxidized vegetable oils and liquid polybutenes.

A particularly desirable plasticizer is tris (2-chloroisopropyl) phosphate (TCPP). The plasticizer can be entirely TCPP. The plasticizer, halogen and phosphorous concentrations can all be met using only TCPP.

The concentration of plasticizer in the OCF formulation is 15 wt % or more, preferably 17 wt % or more and can be 20 wt % or more, even 25 wt % or more while at the same time is typically 30 wt % or less, preferably 25 wt % or less and can be 20 wt % or less and even 18 wt % or less based on total OCF formulation weight. When the plasticizer exceed 25 wt %, the resulting foam tends to shrink. Poor flame performance results when the concentration of plasticizer is below 15 wt %.

The OCF formulation further comprises a blowing agent. The blowing agent serves to froth the formulation into a foam when sprayed from a pressurized container. In order to achieve desirable resulting foam densities, blowing agent is typically present at a concentration of 1.5 millimoles or more, preferably 2 millimoles or more and can be 2.5 millimoles or more, 3 millimoles or more, even 4 millimoles or more and at the same time is typically 6 millimoles or less, preferably 5 millimoles or less, more preferably 4.5 millimoles or less and can be 4 millimoles or less, 3 millimoles or less, even 2 millimoles or less based on grams of OCF formulation without blowing agent. Suitable blowing agents include those selected from a group consisting of alkanes such as heptane, hexane, n-pentane, iso-pentane, n-butane, iso-butane, propane, cyclohexane, and cyclopentane; ethers such as furan, dimethyl ether, diethyl ether, methylal, and heptafluorodimethyl ether; ketones such as acetone and methyl ethyl ketone; alkyl carbozylates such as methyl formate, dimethyl oxalate and ethyl acetate; and halogenated alkanes such as methylene chloride, difluoromonochloromethane, difluoromethane, 1,1,1,2-tetrafluoroethane, difluoroethanes, 1-chloro-2,2,2,-trifluoroethane, 2,2-dichloro-2-fluoroethane, ethylchloride, dichloroethane, pentafluoropropane, heptafluoropropane; hydrohaloolefin, and trans-1,3,3,3-tetrafluoropropene; as well as carbon dioxide, argon, and nitrogen.

Desirably, the blowing agent comprises or consists of isobutane, propane and dimethyl ether.

Typically, OCF formulations contain a catalyst such as an amine catalyst. Suitable amine catalysts include primary, secondary and tertiary amines with tertiary amine catalysts being particularly desirable. Amine catalysts serve to initiate the reaction between hydroxyl or active hydrogens and isocyanate functional groups. Examples of suitable amine catalysts include dimethyl ethanol amine (DMEA), Bis (N,N-dimethyl-3-amino-propyl) amine, N,N-dimethylcyclohexyl amine (CMCHA), tetraethylenediamine and mixtures thereof. Suitable catalysts other than amine catalysts include organometallic compounds such as dibutyltin dimercaptide and dibutyltin carboxylate.

Particularly desirable as a catalysts is a morpholine compounds such as N-ethylmorpholine; N,N-dimethylaminoethyl morpholine; and N,N'-dimorpholinediethyl ether.

Catalysts are desirably present in the OCF formulation at a concentration of at least 5 milliequivalents by weight of nitrogen per gram mole of —NCO functional group (meqN/gmolNCO), preferably 10 or more meqN/gmolNCO or more and more preferably 15 or more meqN/gmolNCO and at the same time is desirably present at a concentration of 100 meqN/gmolNCO or less, preferably 75 meqN/gmolNCO or less and most preferably 50 meqN/gmol NCO or less.

The OCF formulation desirably comprises at least one surfactant. Surfactants are useful to provide emulsion stability between the blowing agent and the rest of the ingredients as well as providing stability to the resulting foam cell structure during dispensing and curing. Suitable surfactants include polysiloxane polyoxyalkylene surfactants. Surfactants are generally present at a concentration of 0.5 wt % or more, preferably 1.5 wt % or more and more preferably 2.0 wt % or more while at the same time generally 5.0 wt % or less, preferably 4.0 wt % or less and most preferably 3.0 wt % or less based on total OCF formulation weight.

The OCF formulation of the present invention can further comprise or be free of any one or any combination of more than one of the following component: cell openers (such as silicone-containing surfactants), crosslinking agents and chain extending agents (such as 1,4-butanediol, glycerin, diethanolamine, triethanolamine, ethylene diamine, xylenediamine, and methylene bis (o-chloroanaline)), silane terminated alcohols, antioxidants and colorants as well as adjuvants that provide dimensional stability (such as polybutadiene elastomers). Suitable polybutadiene elastomers include those having a viscosity of at least 500 milliPascals, preferably at least 2 Pascals (Pa) and more preferably at least 3 Pa as measured at 20 degrees Celsius (° C.). One particularly suitable polybutadiene elastomer comprises about 75 wt % 1,4-cis double bonds, approximately 24 wt % 1,4-trans double bonds and approximately one wt % vinyl double bonds and has a molecular weight (vapor-pressure osmotic) of approximately 3000 grams per mole. Polybutadiene can be present in a concentration in a range of 0.03 to 1.0 wt % based on total OCF formulation weight. Polyoctenylene can also, or alternatively, be present at a concentration in a range of 0.02 to 0.5 wt % based on total OCF formulation weight. The polybutadiene and the polyoctenylene preferably have a number average molecular weight of about 800 to 10,000 g/mol and preferably a number average molecular weight range of about 1,000 to 6,000 g/mol and, particularly, of about 1,500 to 4,000 g/mol.

Unlike the formulation and foam of WO2010/058036, the OCF formulation and resulting foam of the present invention is free of expandable graphite. WO2010/058036 uses expandable graphite to improve flame retardant properties. However, the present OCF formulation does not require expandable graphite to achieve a demanding B2 rating in DIN 4012 testing.

The present invention further includes a method of using the OCF formulation of the present invention. The method comprises dispensing the OCF formulation from a pressurized vessel to form a polyurethane foam. OCF formulations are typically provided for use in a pressurized vessel (that is, container). Once released from the container, the OCF formulation expands into a froth and cures in the presence of moisture in the air around it to form a flexible foam. The OCF formulation is particularly well designed to serve as a fenestration opening sealant for use in a method that include dispensing the OCF formulation from a pressurized vessel into gaps around or adjacent to a fenestration opening. Typically, the OCF formulation is dispensed in strips within a gap so that the strip expands into foam having a thickness of 30 millimeters (mm) or less, preferably 25 mm or less, more typically 20 mm or less, and can be 17 mm or less, 15 mm or less, 13 mm or less, 12 mm or less and even 10 mm or less. Often, when filling a gap such as a gap around a fenestration opening, the foam thickness corresponds to the width of the gap because the gap has a depth greater than its width. So the OCF formulation of the present invention is useful for filling gaps having a width as described above for foam thickness.

The OCF formulation expands into a flexible polyurethane foam that achieves a B2 rating in DIN 4102 testing. This is a particularly difficult standard to meet for polymeric foam but is becoming a requirement for foam building materials in certain geographies around the world.

The flexible polyurethane foam is desirably an open cell foam, which means it has more than 50%, preferably 60% or more, more preferably 70% or more and can have 80% or more, 90% or more and even 100% open cell content as determined by ASTM D6226 testing. The open cell character of the foam allows blowing agent to escape from the foam and also allows for some degree of vapor permeation. Desirably the flexible polyurethane foam demonstrates an air flow rate in a range of 0.05 and 1.2 liters per minute as determined by ASTM D3574 to achieve blowing agent and vapor permeability without significantly sacrificing thermal insulation properties.

The flexible polyurethane foam is also desirably characterized by having a density of 25 kilograms per cubic meter ($kg/m^3$) or more, and can be 30 $kg/m^3$ or more, 35 $kg/m^3$ or more and even 40 $kg/m^3$ or more while at the same time is typically 50 $kg/m^3$ or less, preferably 45 $kg/m^3$ or less and can be 40 $kg/m^3$ or less. Determine foam density according to ISO 845-95.

EXAMPLES

The following examples serve to further illustrate embodiments of the present invention. A description of the components for use in the OCF formulations is in Table 1. Specific formulations and analyses follow.

TABLE 1

| Component | Description | Availability |
| --- | --- | --- |
| MDI | Diphenyl methane diisocyanate polymeric isocyanate having a nominal functionality of 2.7 and nominal NCO equivalent weight of 135 and NCO content of 31.1%. | VORANATE ™ M229 polymeric MDI |
| MDI 2 | Diphenyl methane diisocyanate polymeric isocyanate having a nominal functionality of 3.2 and nominal NCO equivalent weight of 141 and an NCO content of 29.8%. | VORANATE ™ M595 high functional MDI |
| Polyol (f = 3) | Glycerine propoxylated polyether triol having a nominal functionality of three and a hydroxyl equivalent weight of 360. | VORANOL ™ CP 1055 polyol |

TABLE 1-continued

| Component | Description | Availability |
|---|---|---|
| Polyol (f = 2) | Polypropylene oxide polyol with a nominal functionality of 2.0 and a hydroxyl equivalent weight of 4000. | ACCLAIM ™ 8200N polyether polyol |
| Polyol (f = 3.3) | Aromatic initiated oxypropylene-oxyethylene polyol with hydroxyl number of 195 and average functionality of 3.3 | POLYOL IP 585 available from The Dow Chemical Company |
| Polyol (f = 4.5) | Sucrose/glycerine initiated polyether polyol having a functionality of 4.5. | VORANOL ™ 360 polyether polyol |
| Colorant | Lemon yellow colorant with hydroxyl number of 84. | REACTINT ™ yellow x15 |
| Surfactant | Organo-silicone surfactant | NIAX ™ silicone L-5345 surfactant |
| Catalyst | 2,2-dimorpholinediethylether | JEFFCAT ™ DMDEE catalyst |
| Plasticizer | Tris(2-chloropropyl) phosphate | (generally available) |
| Br-Polyol 1 | Brominated diester/ether diol of tetrabromophthalic anhydride | SAYTEX ™ RB7970 flame retardant. |
| Br-Polyol 2 | Alkoxylated tetrabromophthalate diol with 43 wt % bromine, a nominal functionality of 2.0 and a hydroxyl equivalent weight of 230. | PHT4 ™ -DIOL LV flame retardant |
| BA 1 | Dimethyl ether | (generally available) |
| BA 2 | 65 wt % isobutane/35 wt % propane | PB4.2 from Scharr CPC |

VORANATE, VORANOL are trademarks of The Dow Chemical Company. ACCLAIM is a trademark of Bayer MaterialScience. REACTINT is a trademark of Mililiken & Company. NIAX is a trademark of General Electric Company. JEFFCAT is a trademark of JPMorgan Chase Bank. SAYTEX is a trademark of Albemarle Corporation. PHT4 is a trademark of Great Lakes Chemical Corporation.

Preparation and Foam Characterization

For each of the following Examples (Exs) and Comparative Examples (Comp Exs), prepare the OCF formulation by introducing the formulation component other than blowing agent (BA) components into a tin-plated steel can and seal the can so as to have a valve providing fluid communication into the can. Inject into the can the appropriate amount of BA1 and then BA2.

Obtain foam samples of each Ex and Comp Ex by dispensing from the can a strip of OCF formulation and allowing the foam to cure. Characterize the foam in the following ways:

Fire performance. Characterize a 20 mm wide foam sample that is 20 mm thick, 50 mm wide and 190 mm long and oriented in a vertical orientation with the 190 mm length extending upwards according to DIN4102 testing. The sample is located between two gypsum boards with a nominal gap of 20 mm.

Density. Characterize a cylindrical foam bead sample of 300 mm length and a diameter of 30 mm of each formulation using the ISO845-95 volume method in water.

Compressive Recovery. Characterize a 19 mm thick, 50 mm wide and 50 mm long foam sample according to ISO 1856. Calculate compressive recovery as 100% minus the compression set in % as determined according to the above standard after 75% compression for 72 hours followed by recovery for at least 24 hours (method B)1

Open Cell Content. Determine open cell content according to ASTM D6226 on samples that are 19 mm thick, 51 mm wide and 51 mm long.

Air Flow. Determine air flow through foam using a 19 mm thick, 51 mm wide and 51 mm long foam sample using TEXTEST FX3300 equipment from TEXTEST Instruments using their standard test procedure.

Effect of Polyol Functionality Ratio

The following Examples (Exs) and Comparative Examples (Comp Exs) illustrate the importance of having a rhoB value that is in a range of 0.2 to 0.75. Formulations and characterizations are in Table 2. Components in the formulation are reported in wt % relative to the total formulation weight.

The data in Table 2 illustrates that if rhoB is less than 0.2 then the resulting foam fails to achieve a B2 rating in DIN4102 testing, and when rhoB is greater than 0.75 the dispensed formulation collapses and fails to form a foam.

TABLE 2

| Components | Comp Ex A | Ex 1 | Ex 2 | Ex 3 | Ex 4 | Comp Ex B |
|---|---|---|---|---|---|---|
| MDI | 29.88 | 30.75 | 30.89 | 31.36 | 32.07 | 33.23 |
| Polyol (f = 3) | 0.00 | 2.34 | 3.34 | 4.77 | 6.90 | 10.43 |
| Polyol (f = 2) | 36.33 | 33.28 | 31.94 | 30.09 | 27.24 | 22.58 |
| Colorant | 0.10 | 0.10 | 0.10 | 0.10 | 0.10 | 0.10 |
| Surfactant | 3.02 | 3.00 | 3.02 | 3.00 | 3.02 | 3.02 |
| Catalyst | 0.62 | 0.62 | 0.62 | 0.62 | 0.62 | 0.62 |
| Plasticizer | 17.48 | 17.50 | 17.51 | 17.50 | 17.50 | 17.50 |
| BA 1 | 4.75 | 4.69 | 4.75 | 4.75 | 4.74 | 4.73 |
| BA 2 | 7.82 | 7.72 | 7.83 | 7.82 | 7.82 | 7.79 |
| Formulation Characterization | | | | | | |
| rhoB | 0 | 0.43 | 0.53 | 0.63 | 0.73 | 0.83 |
| Wt % P | 1.9 | 1.9 | 1.9 | 1.9 | 1.9 | 1.9 |
| Wt % Cl | 6.5 | 6.5 | 6.5 | 6.5 | 6.5 | 6.5 |
| Wt % Br | 0 | 0 | 0 | 0 | 0 | 0 |
| Foam Properties | | | | | | |
| DIN 4102 Rating | B3 | B2 | B2 | B2 | B2 | NA* |
| Open Cell Content (%) | 96 | 79 | 83 | 63 | 65 | NA* |
| Airflow (liters per second) | 0.015 | 0.009 | 0.007 | 0.004 | 0.006 | NA* |
| Elastic Recovery (%) | 95.8 | 93.1 | 93.2 | 85.3 | 79.2 | NA* |
| Density (kg/m$^3$) | 48.3 | 43.8 | 43.9 | 39.1 | 46.1 | 75.8 |

*NA - foam collapsed so could not be characterized.

Effect of Brominated Polyol

The following Comparative Examples (Comp Exs) illustrate the effect of brominated polyol. Formulations and characterizations are in Table 3. Components in the formulation are reported in wt % relative to the total formulation weight.

The results in Table 3 illustrate that the tested levels of bromine still allow the foam to achieve B2 rating, but the foam is no longer flexible because it has an elastic recovery of less than 45%.

TABLE 3

| Components | Comp Ex C | Comp Ex D | Comp Ex E |
|---|---|---|---|
| MDI | 37.1 | 37.10 | 35.58 |
| Polyol (f = 3) | 0.00 | 3.49 | 6.02 |
| Polyol (f = 2) | 17.13 | 17.13 | 23.92 |
| Br-Polyol 1 | 9.97 | 6.48 | 0 |
| Br-Polyol 2 | 0 | 0 | 4.16 |
| Colorant | 0.11 | 0.11 | 0.10 |
| Surfactant | 1.99 | 1.99 | 2.01 |
| Catalyst | 0.70 | 0.70 | 0.65 |
| Plasticizer | 19.93 | 19.93 | 14.99 |
| BA 1 | 4.90 | 4.90 | 4.74 |
| BA 2 | 8.17 | 8.17 | 7.81 |
| Formulation Characterization | | | |
| rhoB | 0 | 0.30 | 0.41 |
| Wt % P | 2.5 | 2.4 | 1.6 |
| Wt % Cl | 8.54 | 8.16 | 5.57 |
| Wt % Br | 3.54 | 2.30 | 2.05 |
| Foam Properties | | | |
| DIN 4102 Rating | B2 | B2 | B2 |
| Open Cell Content (%) | 71 | 72 | 55 |
| Airflow (liters per second) | 0.001 | 0.001 | 0.002 |
| Elastic Recovery (%) | 31.7 | 32.7 | 37.9 |
| Density (kg/m³) | 38.4 | 35.3 | 36.6 |

Effect of Plasticizer

The following Examples (Exs) and Comparative Examples (Comp Exs) illustrate the effect of brominated polyol. Formulations and characterizations are in Table 4. Components in the formulation are reported in wt % relative to the total formulation weight.

The results in Table 4 illustrate that too little plasticizer results in a non-flexible foam and too much plasticizer results in collapse of the froth and failure to form a meaningful foam. When 7.5 wt % TCPP is used as a plasticizer the resulting foam is not flexible, nor does it achieve a B2 fire rating (see Comp Ex F). When 15 wt % and 30 wt % TCPP is used the foam is flexible and desirable (see Exs 5 and 6). When 40 wt % TCPP is used the formulation collapses (see Comp Ex G).

TABLE 4

| Components | Comp Ex F | Ex 5 | Ex 6 | Comp Ex G |
|---|---|---|---|---|
| MDI | 37.12 | 33.69 | 25.46 | 20.79 |
| Polyol (f = 3) | 7.95 | 7.26 | 3.89 | 3.20 |
| Polyol (f = 2) | 31.60 | 28.68 | 24.42 | 19.91 |
| Colorant | 0.10 | 0.10 | 0.10 | 0.10 |
| Surfactant | 2.00 | 2.00 | 3.01 | 3.02 |
| Catalyst | 0.70 | 0.64 | 0.50 | 0.41 |
| Plasticizer | 7.45 | 15.07 | 30.06 | 40.01 |
| BA 1 | 4.94 | 4.75 | 4.74 | 4.74 |
| BA 2 | 8.14 | 7.82 | 7.82 | 7.81 |
| Formulation Characterization | | | | |
| rhoB | 0.733 | 0.733 | 0.633 | 0.633 |
| Wt % P | 0.82 | 1.64 | 3.27 | 4.35 |
| Wt % Cl | 2.79 | 5.6 | 11.17 | 14.87 |
| Wt % Br | 0 | 0 | 0 | 0 |
| Foam Properties | | | | |
| DIN 4102 Rating | B3 | B2 | B2 | NA* |
| Open Cell Content (%) | 74.0 | NM* | 91 | NA* |
| Airflow (liters per second) | 0.001 | NM* | 0.017 | NA* |
| Elastic Recovery (%) | 49.1 | NM* | 87.9 | NA* |
| Density (kg/m³) | 36.1 | 44.0 | 76.6 | NA* |

*NM indicates this property was not measured, but is expected to be similar to Ex 4.
NA* not applicable because no meaningful foam was achieved.

Effect of Different Polyols and Isocyanates.

The following Examples (Exs) illustrate the ability to prepared an OCF formulation of the present invention with aliphatic or aromatic polyols and isocyanates. Formulations and characterizations are in Table 5. Components in the formulation are reported in wt % relative to the total formulation weight.

Ex 7 uses an aromatic polyether polyol with functionality greater than 3. Ex 8 use an aliphatic polyether polyol having a functionality greater than 3. Ex 9 uses a higher functional isocyanate than the previous examples. Exs 10 and 11 use different NCO levels.

TABLE 5

| Components | Ex 7 | Ex 8 | Ex 9 | Ex 10 | Ex 11 |
|---|---|---|---|---|---|
| MDI | 31.49 | 31.69 | 0 | 27.54 | 35.25 |
| MDI 2 | 0 | 0 | 32.29 | 0 | 0 |
| Polyol (f = 3) | 0 | 0 | 4.67 | 5.30 | 4.22 |
| Polyol (f = 2) | 30.81 | 32.30 | 29.49 | 33.47 | 26.65 |
| Polyol (f = 3.3) | 3.90 | 0 | 0 | 0 | 0 |
| Polyol (f = 4.5) | 0 | 2.22 | 0 | 0 | 0 |
| Colorant | 0.10 | 0.10 | 0.10 | 0.10 | 0.10 |
| Surfactant | 3.00 | 3.00 | 3.03 | 3.00 | 3.00 |
| Catalyst | 0.62 | 0.62 | 0.37 | 0.53 | 0.71 |
| Plasticizer | 17.50 | 17.50 | 17.50 | 17.50 | 17.50 |
| BA 1 | 4.75 | 4.75 | 4.74 | 4.75 | 4.75 |
| BA 2 | 7.83 | 7.82 | 7.81 | 7.82 | 7.82 |
| Formulation Characterization | | | | | |
| rhoB | 0.634 | 0.633 | 0.633 | 0.634 | 0.632 |
| Wt % P | 1.9 | 1.9 | 1.9 | 1.9 | 1.9 |
| Wt % Cl | 6.51 | 6.51 | 6.5 | 6.51 | 6.51 |
| Wt % Br | 0 | 0 | 0 | 0 | 0 |
| Foam Properties | | | | | |
| DIN 4102 Rating | B2 | B2 | B2 | B2 | B2 |
| Open Cell Content (%) | 86 | 77 | 67 | 80 | 65 |
| Airflow (liters per second) | 0.004 | 0.011 | 0.005 | 0.014 | 0.007 |
| Elastic Recovery (%) | 68.8 | 69.1 | 86.9 | 74.2 | 57.5 |
| Density (kg/m³) | 41.7 | 43.9 | 41.6 | 67.4 | 40.1 |

What is claimed is:

1. A one component spray flexible polyurethane foam formulation, said one component spray flexible polyurethane foam formulation characterized by comprising:
   (a) a polymeric isocyanate that has a nominal functionality in a range of 2.5 to 3.5 and present at a concentration sufficient to provide 10 to 20 weight-percent NCO functional groups base on the total weight of isocyanate and polyol in the formulation;
   (b) a polyol component that is at least 85 weight-percent aliphatic polyol based on total polyol component weight and that has a mole ratio of polyol having three or more hydroxyls per molecule to total moles of all polyol that is in a range of 0.2 to 0.60;

(c) a plasticizer at a concentration in a range of 17 to 30 weight-percent based on total formulation weight;

(d) a phosphorous concentration in a range of 1.5 to 3.5 weight-percent based on the weight of total formulation without blowing agent;

(e) a halogen concentration in a range of 6.0 to 11.5 weight-percent based on the weight of total formulation without blowing agent;

(f) a blowing agent at a concentration in a range of 1.5 to 5 millimoles per gram of formulation weight without blowing agent;

where the foam formulation is further characterized by being free of expandable graphite and free of halogenated polyol; and the foam formulation is further characterized by expanding into a flexible foam having a density of 25-50 kg/m$^3$.

2. The one component spray polyurethane foam formulation of claim 1, further characterized by the plasticizer being selected from a group consisting of tris (1-chloro-2-propyl) phosphate, triethyl phosphate and dimethyl propyl phosphonate.

3. The one component spray polyurethane foam formulation of claim 1, further characterized by the plasticizer providing all of the halogen and phosphorous in the one component spray polyurethane foam formulation.

4. The one component spray polyurethane foam formulation of claim 1, further characterized by the plasticizer being tris (2-chloropropyl) phosphate.

5. The one component spray polyurethane foam formulation of claim 1, further characterized by being free of bromine.

6. A method of using the one component spray polyurethane foam formulation of claim 1, the method comprising dispensing the one component spray polyurethane foam formulation from a pressurized vessel to form a polyurethane foam.

7. The method of claim 6, further characterized by the polyurethane foam having a thickness of less than 30 millimeters.

8. The method of claim 6, further characterized by dispensing the one component spray polyurethane foam formulation in an opening adjacent to a fenestration opening.

9. The method of claim 6, further characterized by the foam having a compressive recovery of more than 45% in 24 hours after compressing by 75% of its original thickness for three days as determined according to ISO 1856, an open cell content of 70% or more as determined per ASTM D6226, an air flow rate within a range of 0.001 and 0.02 liters per second as determined by ASTM D3574 and achieving a B2 rating in DIN 4102 testing.

* * * * *